US010824802B2

(12) United States Patent
Chen

(10) Patent No.: US 10,824,802 B2
(45) Date of Patent: Nov. 3, 2020

(54) SPREADSHEET-BASED PROGRAMMING LANGUAGE ADAPTED FOR REPORT GENERATION

(71) Applicant: BiBo Labs, Inc., Irwindale, CA (US)

(72) Inventor: Michael J. Chen, San Marino, CA (US)

(73) Assignee: BIBO LABS, INC., San Marino, CA (US)

( * ) Notice: Subject to any disclaimer, the term of this patent is extended or adjusted under 35 U.S.C. 154(b) by 0 days.

(21) Appl. No.: 13/728,702

(22) Filed: Dec. 27, 2012

(65) Prior Publication Data

US 2013/0290822 A1 Oct. 31, 2013

Related U.S. Application Data

(60) Provisional application No. 61/581,515, filed on Dec. 29, 2011.

(51) Int. Cl.
*G06F 40/18* (2020.01)
*G06F 40/117* (2020.01)
(Continued)

(52) U.S. Cl.
CPC ............. *G06F 40/18* (2020.01); *G06F 9/448* (2018.02); *G06F 40/103* (2020.01);
(Continued)

(58) Field of Classification Search
CPC .... G06F 17/246; G06F 17/248; G06F 17/348; G06F 40/174; G06F 40/177; G06F 40/18;
(Continued)

(56) References Cited

U.S. PATENT DOCUMENTS 6,078,924 A * 6/2000 Ainsbury ............. G06F 16/951
6,816,630 B1 * 11/2004 Werth et al. .................. 382/287
(Continued)

FOREIGN PATENT DOCUMENTS

JP H11161656 A 6/1999
JP 2004538534 A 12/2004
(Continued)

OTHER PUBLICATIONS

Steve Punte, "Excel Reports with Apache Cocoon and POI", Jan. 22, 2003, XML.com, pp. 9 (Year: 2003).*
(Continued)

*Primary Examiner* — Chau T Nguyen
(74) *Attorney, Agent, or Firm* — Wilson Sonsini Goodrich & Rosati

(57) ABSTRACT

Computer-based systems, software, and methods are provided for implementing a spreadsheet-based programming language adapted for report generation. The system comprises: a networked computer comprising a processor, an operating system configured to perform executable instructions, and a memory device; a computer program including instructions executable by a digital processing device to create an environment to implement a spreadsheet-based programming language for report generation, wherein the environment comprises: a plurality of template spreadsheets containing template worksheets and metadata worksheets comprising a definition of one or more external datasets, search filters and sort filters; a software module for storing the structure of one or more designated, external datasets within a spreadsheet, wherein references to each dataset are created through cell-based formulas; a software module to interpret procedural functions, which are designated via tags in a report design template; a software module for executing
(Continued)

cross-database queries and a software module for generating reports.

22 Claims, 15 Drawing Sheets

(51) Int. Cl.
G06F 40/174 (2020.01)
G06F 40/183 (2020.01)
G06F 40/177 (2020.01)
G06F 40/186 (2020.01)
G06F 40/103 (2020.01)
G06F 9/448 (2018.01)

(52) U.S. Cl.
CPC .......... *G06F 40/117* (2020.01); *G06F 40/174* (2020.01); *G06F 40/177* (2020.01); *G06F 40/183* (2020.01); *G06F 40/186* (2020.01)

(58) Field of Classification Search
CPC ...... G06F 40/183; G06F 40/186; G06F 9/448; G06F 40/103; G06F 40/117
USPC .......................................................... 715/212
See application file for complete search history.

(56) References Cited

U.S. PATENT DOCUMENTS

| | | | |
|---|---|---|---|
| 7,197,696 B1 | 3/2007 | Muzumdar | |
| 7,694,315 B2* | 4/2010 | Carter et al. | 719/328 |
| 7,783,966 B2* | 8/2010 | Mitsui | 715/212 |
| 8,095,870 B2* | 1/2012 | Jiang | G06F 40/186 |
| | | | 715/236 |
| 8,407,668 B2* | 3/2013 | Lindhorst | 717/115 |
| 2004/0221233 A1 | 11/2004 | Thielen | |
| 2005/0268064 A1* | 12/2005 | Cohen et al. | 711/170 |
| 2006/0085444 A1* | 4/2006 | Sarawgi et al. | 707/100 |
| 2006/0095832 A1* | 5/2006 | Serra | G06F 17/246 |
| | | | 715/209 |
| 2006/0107196 A1* | 5/2006 | Thanu et al. | 715/503 |
| 2006/0129913 A1* | 6/2006 | Vigesaa et al. | 715/503 |
| 2006/0136436 A1* | 6/2006 | Aftab | G06F 16/80 |
| 2007/0061344 A1* | 3/2007 | Dickerman et al. | 707/100 |
| 2007/0088691 A1* | 4/2007 | Dickerman et al. | 707/5 |
| 2009/0055341 A1 | 2/2009 | Bidkar et al. | |
| 2009/0113283 A1* | 4/2009 | Sol et al. | 715/212 |
| 2009/0193050 A1* | 7/2009 | Olson | G06F 17/30592 |
| 2010/0107048 A1* | 4/2010 | Takahara | 715/219 |
| 2011/0016379 A1* | 1/2011 | McColl et al. | 715/219 |
| 2011/0083167 A1* | 4/2011 | Carpenter | G06F 17/30563 |
| | | | 726/4 |
| 2011/0098985 A1* | 4/2011 | Lawson | 703/1 |
| 2011/0106789 A1* | 5/2011 | Gao | G06F 17/30545 |
| | | | 707/713 |
| 2011/0314364 A1 | 12/2011 | Hargarten et al. | |
| 2013/0073937 A1* | 3/2013 | Fernandes | G06Q 10/067 |
| | | | 715/212 |

FOREIGN PATENT DOCUMENTS

| | | |
|---|---|---|
| WO | WO-03007118 A2 | 1/2003 |
| WO | WO-03098500 A1 | 11/2003 |
| WO | WO 2004/053710 | 6/2004 |

OTHER PUBLICATIONS

PCT/US2012/071788 International Search Report and Written Opinion dated Apr. 12, 2013.
Katsuya. BackOffice Magazine. pp. 163-167 (Apr. 1, 1999).

* cited by examiner

Fig. 7

| | A | B | C | D | E |
|---|---|---|---|---|---|
| 1 | Customer # | 1 | Address | 5288 Rivergrade Rd. | |
| 2 | Customer Name | James | City | Irwindale | |
| 3 | | | State | CA | |
| 4 | | | Zip | 91706 | |
| 5 | | | | | |
| 6 | | ID Desc | Qty | Price | Subtotal |
| 7 | | 2 Hat | 5 | 29.99 | 149.95 |
| 8 | | 1 Vest | 20 | 39.99 | 799.8 |
| 9 | | 2 Hat | 28 | 49.99 | 1399.72 |
| 10 | | 2 Hat | 10 | 39.99 | 399.9 |
| 11 | | 3 Socks | 2 | 23.93 | 47.86 |
| 12 | | 3 Socks | 3 | 83.92 | 251.76 |
| 13 | | 3 Socks | 4 | 28.99 | 115.96 |
| 14 | | 1 Vest | 18 | 29.99 | 539.82 |
| 15 | | 2 Hat | 34 | 39.99 | 1359.66 |
| 16 | | 3 Socks | 3 | 49.99 | 149.97 |
| 17 | | 4 Shirt | 2 | 39.99 | 79.98 |
| 18 | | 5 Jacket | 12 | 23.93 | 287.16 |
| 19 | | 6 Gloves | 12 | 83.92 | 1007.04 |
| 20 | | 1 Vest | 12 | 28.99 | 347.88 |
| 21 | | | | Total | 6936.46 |
| 22 | | | | | |
| 23 | Customer # | 3 | Address | 2388 Live Oak Ave. | |
| 24 | Customer Name | Jennifer | City | Arcadia | |
| 25 | | | State | CA | |
| 26 | | | Zip | 91123 | |
| 27 | | | | | |
| 28 | | ID Desc | Qty | Price | Subtotal |
| 29 | | 3 Socks | 2 | 29.99 | 59.98 |
| 30 | | 4 Shirt | 23 | 39.99 | 919.77 |
| 31 | | 5 Jacket | 2 | 49.99 | 99.98 |
| 32 | | 6 Gloves | 934 | 39.99 | 37350.66 |
| 33 | | | | Total | 38430.4 |

Fig. 14: Oracle

Fig. 15: Salesforce

Fig. 16: Mongo

Fig. 17: Table Metadata Sheet

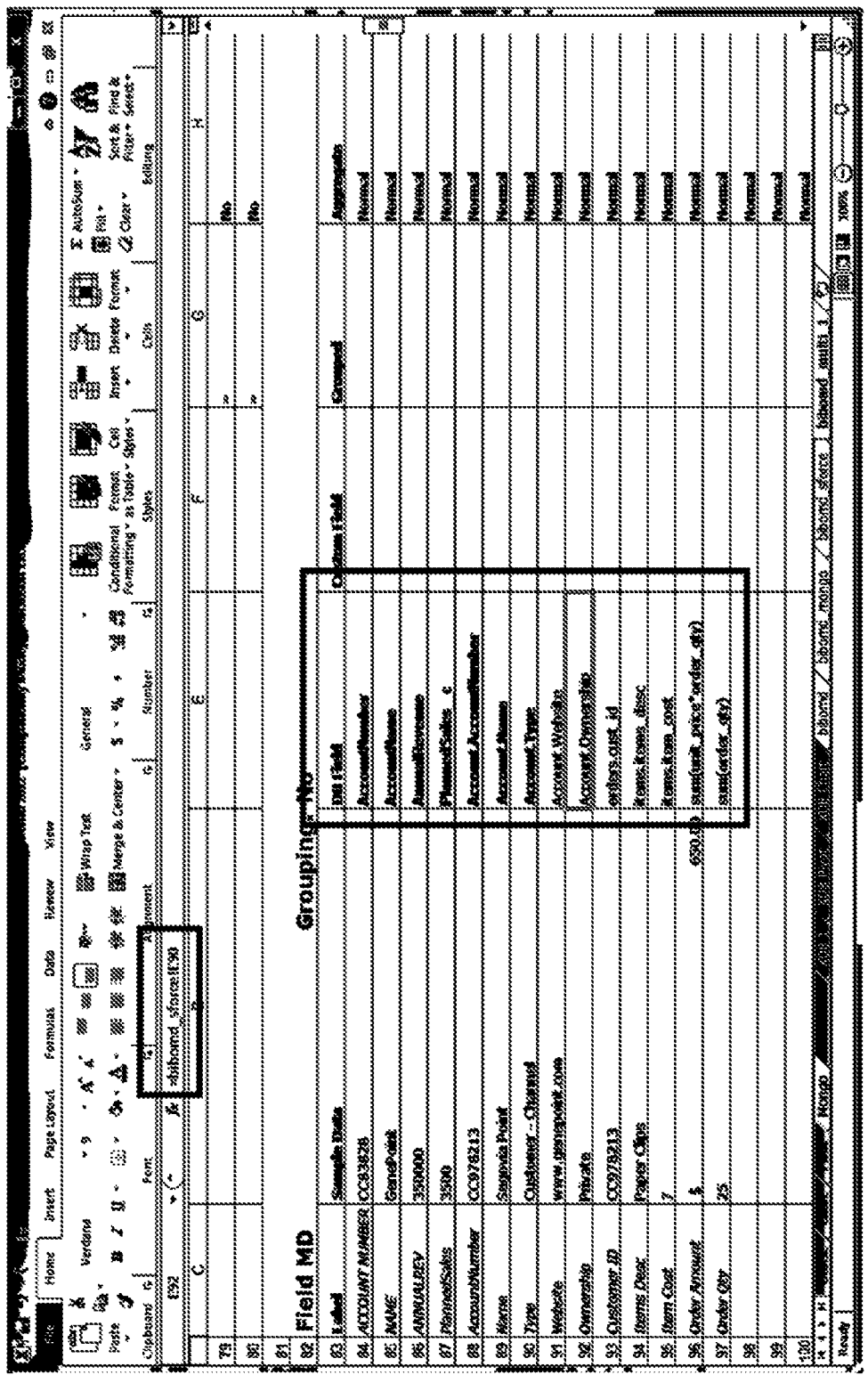
Fig. 18: Cross-database Field Selection

SPREADSHEET-BASED PROGRAMMING LANGUAGE ADAPTED FOR REPORT GENERATION

CROSS-REFERENCE TO RELATED APPLICATIONS

This application claims the benefit of U.S. Provisional Application No. 61/581,515, filed Dec. 29, 2011, which is incorporated herein by reference in its entirety.

BACKGROUND OF THE INVENTION

Existing enterprise reporting tools require users to be intimately involved throughout the design process in third party applications and development environments. Users must be skilled in the art of software development to a certain degree to create reports. After development is complete, existing means of distribution are limited. If an organization has adopted any third party reporting tool (e.g., Crystal Reports), an administrator must install the software on each individual computer that would have access to the report as well as opening direct access to the database. This potentially limits the geographic location of the application and potentially creates opportunity for breaches of security.

SUMMARY OF THE INVENTION

There is a long felt and unmet need for simple enterprise reporting development platforms, environments, and tools which increase accessibility to report design and the reports themselves. Effective enterprise reporting tools facilitate ease of design as well as simple, secure distribution. The inventions disclosed herein enable users to design reports by leveraging their preexisting knowledge of spreadsheets and by maximizing that knowledge base and expanding it with a markup tag language. The system utilizes a simple file system structure to represent the hierarchy of the store reports and displays these objects through a web-based user interface. Upon distribution of a Uniform Resource Locator (URL), one can securely filter, sort, and format a dataset or datasets into a generic spreadsheet.

Accordingly, in one aspect, disclosed herein are computer-based systems for implementing a spreadsheet-based programming language adapted for report generation, said system comprising: an optionally networked computer comprising a processor, an operating system configured to perform executable instructions, and a memory device; a computer program including instructions executable by the digital processing device to create an environment to implement a spreadsheet-based programming language for report generation, wherein said environment comprises: a software module for storing the structure of one or more designated, external datasets within a spreadsheet, wherein references to each dataset are created through cell-based formulas; a software module (e.g., an interpreter) to interpret procedural functions, wherein procedural functions are designated via tags in a report design template; and a software module for generating reports. In some embodiments, one or more external datasets are databases. In further embodiments, one or more databases are relational databases, non-relational databases, object oriented databases, object databases, entity-relationship model databases, associative databases, or XML databases. In some embodiments, one or more external datasets are tabular datasets. In further embodiments, one or more tabular datasets are comma separated text files, tab delimited text files, or binary files with a native dataset embedded with a tabular structured dataset. In some embodiments, the software module for storing the structure of one or more designated, external datasets stores the structure as symbolic references. In some embodiments, the software interpreter interprets said procedural functions to execute a query. In further embodiments, a query optionally includes one or both of: search and sort parameters. In some embodiments, the environment further comprises a software module for saving queries for later execution. In further embodiments, each saved query is represented by a URL that executes the query when activated. In some embodiments, the report design template is a spreadsheet. In further embodiments, the spreadsheet is any version of Microsoft Excel. In other embodiments, the spreadsheet is any version and derivative of OpenOffice Calc. In other embodiments, the spreadsheet is any version and derivative of Lotus 1-2-3. In some embodiments, the software module for generating reports applies the properties of a report design template to a report. In some embodiments, the software module for generating reports generates reports as binary data in the form of one or more spreadsheets, XML documents, HTML documents, reporting software documents, word processor documents, or presentation software documents.

In another aspect, disclosed herein are computer-readable media encoded with a computer program including instructions executable by a computer to create a reporting environment comprising: a software module for storing the structure of one or more designated, external datasets within a spreadsheet, wherein references to each dataset are created through cell-based formulas; a software interpreter to interpret procedural functions, wherein procedural functions are designated via tags in a report design template; and a software module for generating reports. In some embodiments, the software module for generating reports applies the properties of a report design template to a report. In some embodiments, the encoding is permanent, substantially permanent, semi-permanent, or non-transitory. In some embodiments, the software interpreter interprets said procedural functions to execute a query. In further embodiments, a query optionally includes one or both of: search and sort parameters. In some embodiments, the reporting environment further comprises a software module for saving queries for later execution. In further embodiments, each saved query is represented by a URL that executes the query when activated.

In another aspect, disclosed herein are computer-implemented methods of generating a report, comprising the steps of: storing the structure of one or more designated, external datasets within a spreadsheet retained in computer memory; making references to each dataset through cell-based formulas in said spreadsheet retained in computer memory; and interpreting, by software module, one or more report design templates to format an output. In some embodiments, interpreting one or more report design templates to format an output comprises the steps of: reading one or more templates into memory; reading one or more tags defining programming instructions into memory; reading one or more datasets into memory; generating a new spreadsheet; applying the properties of the template to the new spreadsheet; inserting rows and columns into the new spreadsheet based on each dataset; performing the defined programming instructions; and outputting the new spreadsheet in binary data format. In some embodiments, the output is a report. In further embodiments, the report is binary data in the form of one or more spreadsheets, XML documents, HTML documents, reporting software documents, word processor documents, or presentation software documents.

In another aspect, disclosed herein are computer-readable media encoded with a computer program including instructions executable by a computer to create a reporting environment comprising: a software module for referencing one or more datasets through cell-based formulas in a spreadsheet; and a software module for interpreting one or more report design templates to format an output, wherein procedural functions are designated in the report design template via tags. In some embodiments, the cell-based formulas are to some extent input by a user. In some embodiments, the cell-based formulas are to some extent input by a computer system through an auto-generation wizard. In some embodiments, the procedural functions are to some extent input by a user. In some embodiments, the procedural functions are to some extent input by a computer through an auto-generation wizard. In some embodiments, the output is a report. In some embodiments, the encoding is permanent, substantially permanent, semi-permanent, or non-transitory.

In another aspect, disclosed herein are computer-implemented methods for identifying programming instructions for report generation, comprising storing specific tags in a spreadsheet in computer memory, for example, non-volatile and non-transitory memory, to identify programming instructions selected from the group consisting of: designating input; designating output; designating mathematical calculations; designating conditional execution of instructions; and designating repetition of instructions. In some embodiments, one or more tags are utilized in pairs of tags consisting of an opening tag and a closing tag. In some embodiments, one or more tags are utilized as single tags.

BRIEF DESCRIPTION OF THE DRAWINGS

FIG. 7 shows a non-limiting example of the resulting report from the templates of FIGS. 5 and 6 after an external dataset is polled into the interpreter.

Figures 11, 12:
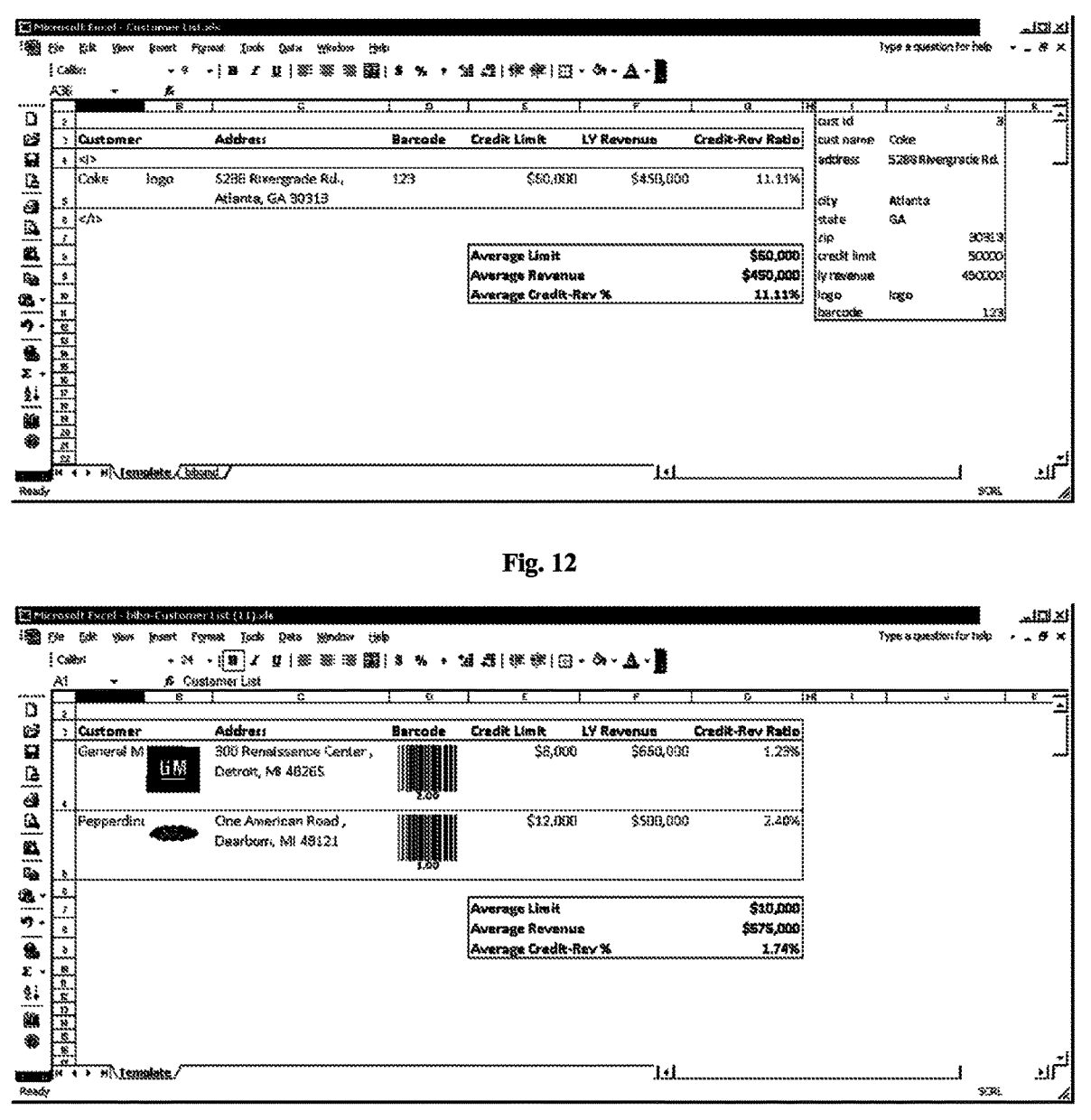

FIG. 11 shows a non-limiting example of a template; in this case, a template including the spreadsheet markup languages presented in Example 1.

FIG. 12 shows a non-limiting example of a report presented in Example 1; in this case, a report with images and barcodes embedded into the respective cells.

FIGS. 14-16 show non-limiting examples of component sub-queries of a cross-database query as described in Example 5; in this case, metadata sheets coming from multiple disparate data sources including Oracle, Salesforce, and Mongo.

FIG. 17 shows a non-limiting example of a cross-database table metadata sheet as described in Example 5.

FIG. 18 shows a non-limiting example of a cross-database field selection as described in Example 5.

DETAILED DESCRIPTION OF THE INVENTION

Various Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "dataset" means a set of rows or records.

As used herein, "worksheet" means a single page or sheet in a spreadsheet program.

As used herein, "row" means a single, implicitly structured data record in a table, worksheet, spreadsheet, or database. In some embodiments, a row of data is a set of cells that run horizontally in a worksheet.

As used herein, "column" means a set of cells that run vertically in a worksheet.

As used herein, "cell" indicates where data is entered into a table, worksheet, spreadsheet, or database. In some embodiments, a cell sits at the intersection between a row and a column.

As used herein, "formula" means a mathematical equation used to calculate a value.

Spreadsheet-Based Programming Language

In some embodiments, the systems, platforms, environments, applications, and methods disclosed herein create or utilize a spreadsheet-based programming language. In some embodiments, a spreadsheet programming language is language which follows certain methods of tagging within a spreadsheet which allows an outside interpreter to abstract the tags and functions into different type of programmatic functions or entities.

In some embodiments, a suitable spreadsheet consists of multiple worksheets within a spreadsheet. In further embodiments, one designated worksheet represents the external dataset or datasets and the means to retrieve from the dataset or datasets. In still further embodiments, there are additional worksheets within the spreadsheet that are used for template designs that reference the metadata worksheet when necessary.

Figure 1:
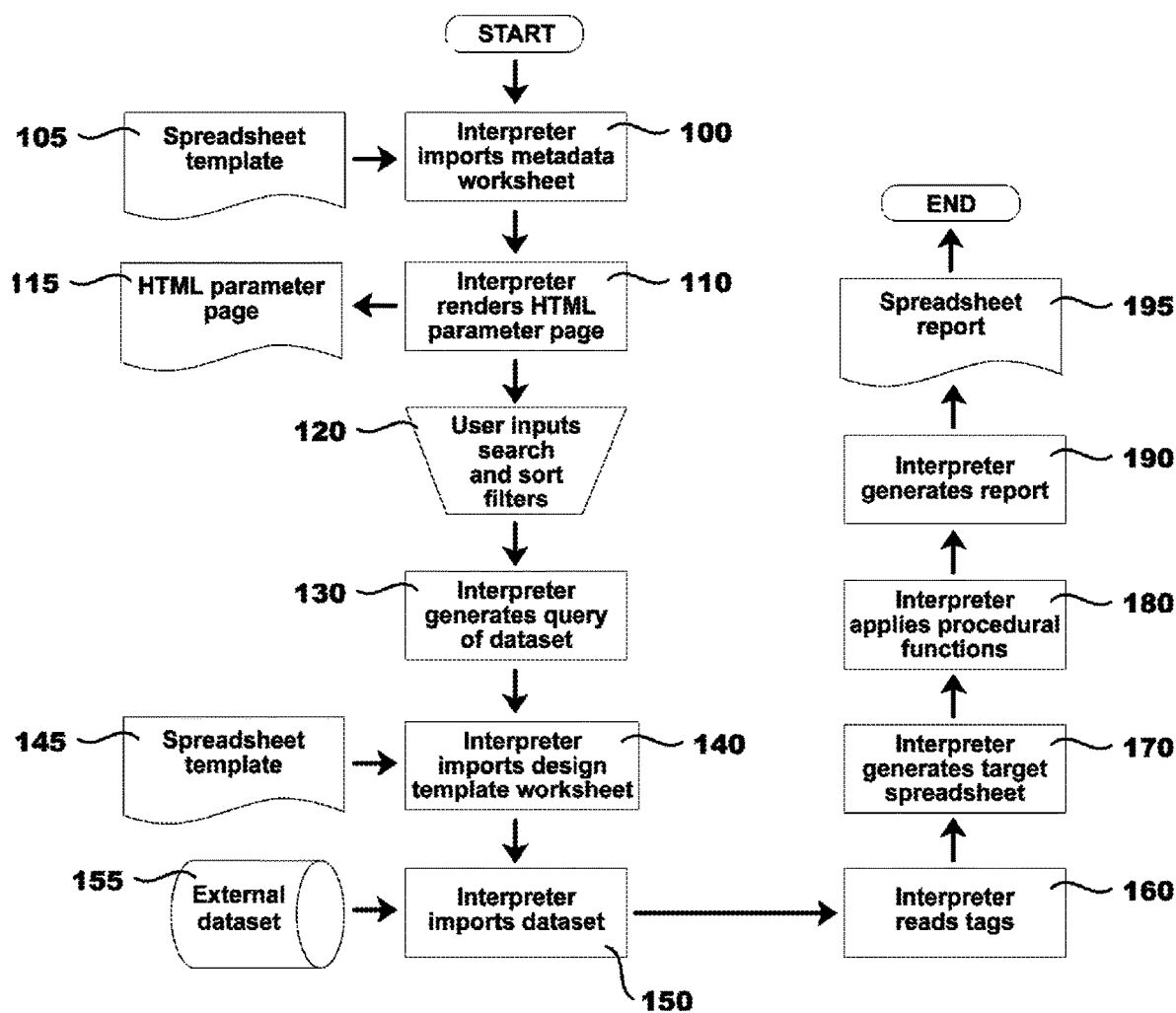
FIG. 1 shows a non-limiting process for implementing a spreadsheet-based programming language adapted for report generation; in this case, a process wherein a metadata worksheet and a design template worksheet are stored in spreadsheets and the output is a report in spreadsheet form.

FIG. 1 depicts a non-limiting, exemplary process for generating a report by implementing spreadsheet-based programming language. The exemplary process of FIG. 1 includes a first phase of rendering a parameter based web form to accommodate user input. In some embodiments, the system loads a spreadsheet 105 into memory and introspects a metadata sheet 100 contained therein. From the metadata sheet, the system finds the respective fields that are used for filtering and sorting. In further embodiments, the system then renders a web page 110, which displays available fields to be sorted. These parameters are prepared for feeding into the interpreter once the user executes search and sort filters 120.

The exemplary process of FIG. 1 also includes a second phase of report generation, which is multistage with stages (A)-(G):

(A) The system retrieves the external dataset or datasets based on user-defined parameters. In some embodiments, the system pulls in all the parameters that were available on the report and extracts data from an external data source through the means of a query 130. In further embodiments, a query is executed on a variety of different data sources including, but not limited to, relational databases, online web services, LDAP databases, and flat files. A particular embodiment is the execution of an SQL statement against a relational database (e.g., Oracle). In this embodiment, the SQL statement is submitted by the interpreter to the Oracle RDBMS and the RDBMS returns a filtered result set which is sorted to the parameters the user had defined in the parameter page (e.g., a HTML form).

(B) The interpreter reads the template worksheet into memory. In some embodiments, the system reads into memory each available template worksheet 140. In some embodiments, one or more template worksheets are, for example, in the same spreadsheet as the metadata worksheet 105. In other embodiments, one or more template worksheets are, for example, in a separate spreadsheet 145. In further embodiments, each template worksheet has a number of properties including, but not limited to, page orientation, print format, page size, worksheet name, default font, background color, and other functions. These properties, in some embodiments, are retained in memory to be applied to the targeted resulting binary output.

(C) The interpreter parses through each worksheet and reads all the tags into memory. In some embodiments, as the interpreter traverses each worksheet, it reads the respective tags for all template worksheets within the spreadsheet 160. In further embodiments, the interpreter then identifies and marks the rows and columns procedural functions are to be run.

(D) The interpreter creates a new report and copies each worksheet from the template into the designated new report with the exclusion of the metadata sheet. In some embodiments, the interpreter creates a new spreadsheet to serve as the basis of the resulting report to be delivered to the user 170. In further embodiments, the system creates one new worksheet in the targeted report with the exception of the metadata worksheet. In still further embodiments, the interpreter copies all the system properties from the template from each one of the source sheets into the newly formed worksheet in the targeted report.

(E) The interpreter inserts rows and columns relative to the designated tags and the size of the external dataset. In some embodiments, the interpreter recalculates the number of rows needed on the basis of the size of the external datasets per worksheet. For example, if the template has a defined number of rows to be looped as 3 and the result set contains 10 results, then the interpreter will insert 30 rows into the targeted worksheet. In further embodiments, the system inserts the determined number of rows and columns into the targeted worksheet. As the system inserts the rows and columns, it creates an index into memory to identify the row number and column number relative to the original.

(F) The interpreter introspects each cell after the data rows and columns have been inserted. In some embodiments, the system then scans each cell through a cell parser to determine whether or not the cell has a formula and applies those procedural functions 180. In further embodiments, if the cell has a formula, the invention breaks apart the cell reference to see whether or not one or more external datasets were referenced. In still further embodiments, if one or more external datasets were referenced, the data is then copied from the external dataset(s) and substitutes the cell value in the formula. In other embodiments, if the cell reference was not referencing an external dataset, then the cell row and column is then recalculated relative to the current position. For example, in the reference template, the original formula in cell C5 could potentially represent "=A5+B2", but due to the number of rows that were inserted, a formula in cell C105 needs a new formula of "=A105+B102".

(G) Cleanup. In some embodiments, the last step is to clean up the designated report. In further embodiments, any markup tags which remain in the targeted rows that were used for references for procedural functions or used as references for external datasets are removed. This leaves a clean spreadsheet incorporating the external datasets into the respective cells and running through the designated iterations while building the necessary indices to mark and designate the position of the respective rowsets.

External Datasets

In some embodiments, the systems, platforms, environments, applications, and methods disclosed herein access, read, and store the structure of one or more designated, external datasets. In some embodiments, the structure of one dataset is accessed, read, and stored. In other embodiments, the structures of a plurality of datasets are accessed, read, and stored simultaneously, substantially simultaneously, or in series. In various embodiments, the structure of 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000 or more datasets, including increments therein are accessed, read, and stored.

In some embodiments, the structure of each dataset is stored within a spreadsheet. In still further embodiments, references to each dataset are created through cell-based formulas in a spreadsheet. Many datasets are suitable for use with the systems, platforms, environments, applications, and methods disclosed herein. By way of non-limiting examples, suitable datasets include tabular datasets and object oriented datasets.

In some embodiments, suitable tabular datasets include databases such as Oracle, Microsoft SQL Server, Informix, Sybase, and MySQL. Other suitable databases include, for example, IBM DB2, Postgres, and dBASE. In some embodiments, suitable tabular datasets include flat files such as character delimited flat files (e.g., CSV, tab delimited, etc.), fixed length flat files (e.g., COBOL), binary flat files, and proprietary ASCII flat files (e.g., DBF).

In some embodiments, suitable object oriented datasets include, by way of non-limiting examples XML and JSON.

Suitable datasets are of any size. For example, the size of a dataset is potentially hundreds of millions of rows before the system filters and sorts the dataset. In various embodiments, a dataset is, by way of non-limiting examples, 1, 10, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, $1\times10^{15}$, $1\times10^{16}$, $1\times10^{17}$, $1\times10^{18}$, $1\times10^{19}$, $1\times10^{20}$, or more rows, including increments therein.

Suitable datasets reside in a variety of locations. In some embodiments, a datasets is a local database or flat file. In further embodiments, a dataset resides in the same memory or storage device as the software disclosed herein. In further embodiments, a dataset resides in the same network (e.g., LAN or WAN) as the software disclosed herein. In some embodiments, a dataset is accessible via the Internet. In further embodiments, a dataset resides with a third party data source (e.g., a cloud provider).

Cross-Database Query Functionality

In some embodiments, the systems, platforms, environments, applications, and methods disclosed herein access, read, and store the structure of one or more designated, external datasets. In certain further embodiments, the one or more external datasets are held in an "in memory" database that does not maintain any database storage mechanism. In some embodiments, the system keeps a complete list of queries in metadata objects, wherein each query is symbolically represented as a single table. In further embodiments, when a query is run, after all the independent result sets are converted to tables, the system joins the tables and layers on additional processing to return a finalized result set for the query. In still further embodiments, the finalized result set is used to create a report.

By way of non-limiting example such a cross-database query initiates a plurality of simultaneous queries, wherein each is symbolically represented as a single table. In various embodiments, a cross-database query initiates, 2, 3, 4, 5, 6, 7, 8, 9, 10, 11, 12, 13, 14, 15, 16, 17, 18, 19, 20 or more simultaneous queries. In various embodiments, a cross-database query initiates, 10, 20, 30, 40, 50, 60, 70, 80, 90, 100 or more simultaneous queries, including increments therein. In various further embodiments, a cross-database query initiates, 100, 200, 300, 400, 500, 600, 700, 800, 900, 1000 or more simultaneous queries, including increments therein. In still further various embodiments, a cross-database query initiates, 1000, 2000, 3000, 4000, 5000, 6000, 7000, 8000, 9000, 10000 or more simultaneous queries, including increments therein. In light of the disclosure provided herein, those of skill in the art will recognize that a cross-database query disclosed herein keeps a list of any suitable number of queries in metadata objects and initiates any suitable number of simultaneous queries. By way of still further example, each of the result sets reside within the in memory database as table objects and the table objects are then processed and run through the cross-database engine to assemble a final result set.

In some embodiments, a cross-database query is based on a list or assortment of disparate queries to be issued by the cross-database query engine. In further embodiments, these queries are stored within a metadata sheet. In still further embodiments, query assembly for each sub-query is based on the field labels of the metadata sheet, wherein each sub query or child query is a direct query to a database.

In some embodiments, a cross-database query stores reference queries as aliased tables. In further embodiments, join points are defined using spreadsheet reference formulas utilizing the equal sign to reference the corresponding field from where that field could potentially pull from. In still further embodiments, after the cross-database query engine retrieves and queries all the respective data sources, the engine constructs a new result set. In some embodiments, the new result set is based on field mappings defined in the metadata sheet, wherein the fields reference the metadata sheets through the reference formula methodology disclosed herein.

Cell-Based Formulas

In some embodiments, the systems, platforms, environments, applications, and methods disclosed herein utilize cell-based formulas to reference each external dataset. Cell-based formulas in spreadsheet programs such as Microsoft Excel, Open Office Calc, and Google spreadsheets utilize a mathematical equation to calculate a value. In light of the disclosure provided herein, those of skill in the art will recognize that these programs typically designate a formula with an equal (=) sign. Cell based formulas are, for example, strings which represent some type of calculation or reference to another cell. See, e.g., FIG. 2. For example, a cell reference formula can constitute "=B2" in cell "A1". This is merely a referencing formula. By way of further example, a formula can also constitute a mathematical function: "=1+ 2". The formula can also constitute of a mix and match of cells to be utilized to handle mathematical functions: "=C12*13*C83". Every spreadsheet incorporates a cell based interpreter to display the resulting compilation of these formulas.

Figures 2, 3:
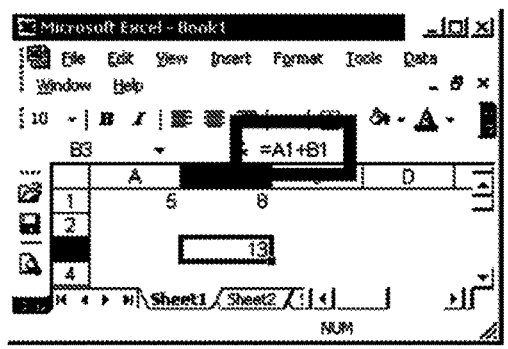
FIG. 2 shows a non-limiting example of a spreadsheet formula.
FIG. 3 shows a non-limiting example of a simple template; in this case, a template for basic customer data.

Referring to FIG. 3, for example, the highlighted cell in A3 has a formula that contains the following: "=H2". In this non-limiting embodiment, cell H2 is designated as a representative sample data to reference an external dataset. By way of further example, this referenced cell symbolizes the data mapping position from the external datasets when inserted into the targeted report.

Procedural Functions

In some embodiments, the systems, platforms, environments, applications, and methods disclosed herein include procedural functions to specify the content and format of a report.

In some embodiments, procedural functions are carried out once. In other embodiments, procedural functions are looped. A loop is a way of repeating a process or statement a particular number of times or until a particular event occurs. In further embodiments, a loop has identifiers that mark where the rows begin and end. In still further embodiments, loops are nested such that one or more loops are embedded within other loops.

In further embodiments, procedural functions are designated via tags in a report design template. In various embodiments, a tag is a letter, number, code, word, phrase, or symbol. In further various embodiments, a tag is enclosed or bracketed by a distinguishing character or series of characters such as brackets (e.g., <, >, [,], {,}, (, ), etc.). In some embodiments, tags are utilized in pairs. In further embodiments, a pair of tags includes an opening tag and a closing tag. In other embodiments, tags are used singly. In some embodiments, a procedural function is designated by one tag. In other embodiments, a procedural function is designated by more than one tag.

The following are non-limiting examples of suitable tags and associated procedural functions:

<i> or <item> Either tag represents the beginning of a loop.

</i> or </item> Either tag represents the closing of a loop.

<d> or <detail> Either tag represents the beginning of a nested loop.

</d> or </detail> Either tag represents the ending of a nested loop.

</p> or </pagebreak> Either tag represents the page break.

In some embodiments, the systems, platforms, environments, applications, and methods disclosed herein include a software interpreter to interpret procedural functions. In further embodiments, a software interpreter interprets procedural functions by reading tags in a report design template.

In some embodiments, an interpreter reads the tags into the system and is capable of, for example, the following functions:

1. Rendering a parameter based form which gives the user the ability to either filter and narrow a dataset and/or sort a resulting dataset; and
2. Importing a template and merging it with an external dataset. In further embodiments, the interpreter then reads all the tags to understand the procedural functions to execute on a new designated spreadsheet. In still further embodiments, the procedural functions are applied and the new designated spreadsheet inherits the properties from the respective templates inclusive of cells, rows, columns, worksheets, and spreadsheets.

Report Design Templates

The systems, platforms, environments, applications, and methods disclosed herein utilize any suitable report design template. In some embodiments, suitable templates follow an explicit structure which reserves a single worksheet as the metadata sheet which contains the properties of an external dataset. In further embodiments, there are other template worksheets which make reference through formulas to the defined external datasets in conjunction with tags to define the beginning and end of loops.

In some embodiments, a report design template is the initial canvas a user or developer creates in order to design a report. In further embodiments, the template constitutes of the following:

1. A metadata sheet; and
2. A template worksheet.

In some embodiments, each template worksheet carries the tags and symbolic references to the external datasets. For example, they contain the logic a user might utilize to generate a report with regards to summation, averages, ratios, or other complex calculations supported by the spreadsheet.

In some embodiments, each template represents a form of what the resulting output report potentially looks like with sample data. FIG. 3 depicts an exemplary customer report template with system reserved tag rows highlighted in rows 2 and 4 as well as columns G and H. In this embodiment, system reserved rows represent procedural functions (rows 2 and 4 with the <item> </item> tags) or external datasets (columns G and H). In some embodiments, templates represent four major functions:

1. Aesthetic representation of the report;
2. The looped rowset range;
3. External datasets; and
4. Logic embedded within the cells in the form of formulas.

In some embodiments, as the interpreter is loaded and run, each template is copied into the designated output spreadsheet while maintaining its respective page, row, column, and cell properties. In further embodiments, the interpreter will read one or more external datasets and map them into each targeted template worksheet within the designated output spreadsheet while maintaining the aesthetic and logical functions designed from the original template worksheet.

Figure 4:
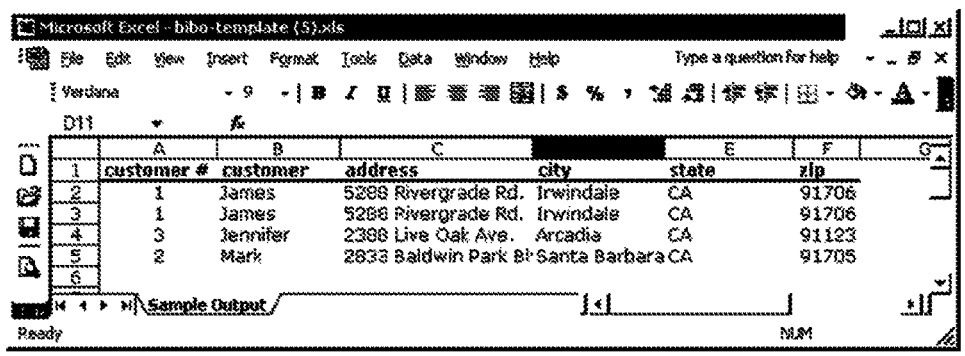
FIG. 4 shows a non-limiting example of the output of the template of FIG. 3 after running an external dataset through an interpreter and rendering the proprietary procedural language according to the tags.

FIG. 4 depicts an exemplary customer report generated based on the exemplary report template of FIG. 3. In this example, an external dataset has been run through an interpreter and the procedural language has been rendered according to the tags in the template.

Figure 5:
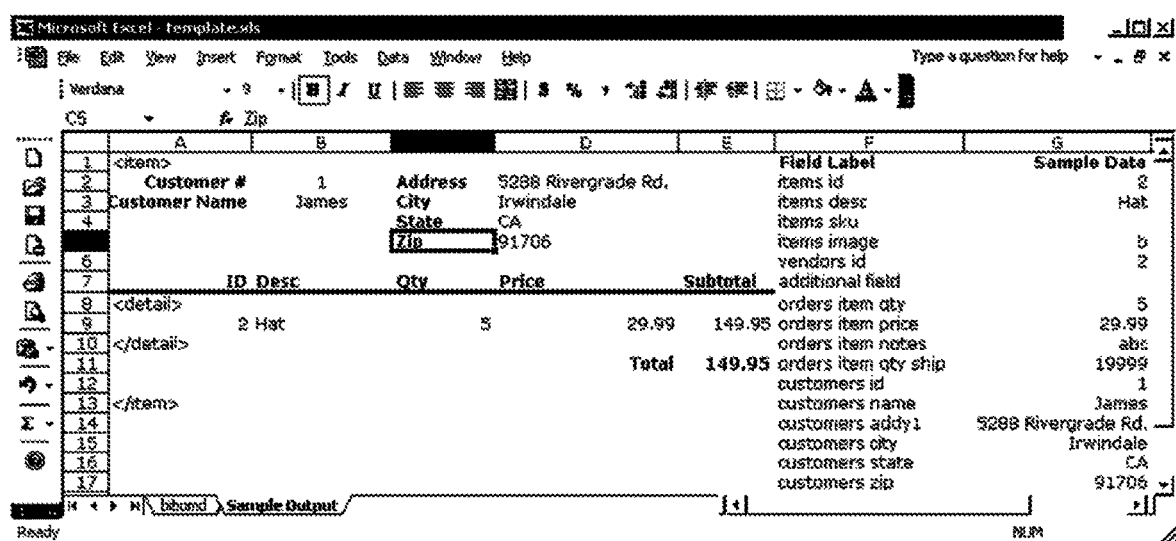
FIG. 5 shows a non-limiting example of a complex report template; in this case, a report template with a nested loop represented with the additional <detail> </detail> tags.

FIG. 5 depicts an exemplary report template that is more complex in nature. In this example, a report template includes a nested loop represented with the additional <detail> </detail> tags.

Figure 6:
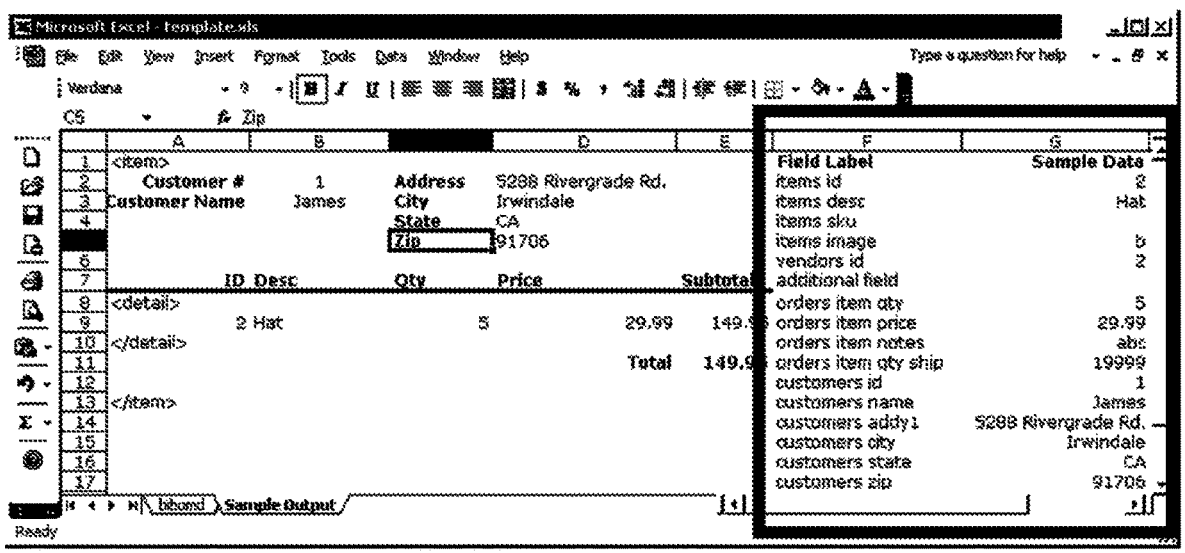
FIG. 6 shows a non-limiting example of the template of FIG. 5 with the references to the external datasets highlighted.

FIG. 6 shows a non-limiting example of the template of FIG. 5 with the references to the external datasets highlighted.

FIG. 7 shows a non-limiting example of the resulting report from the templates of FIGS. 5 and 6 after an external dataset is polled into the interpreter.

Figure 8:
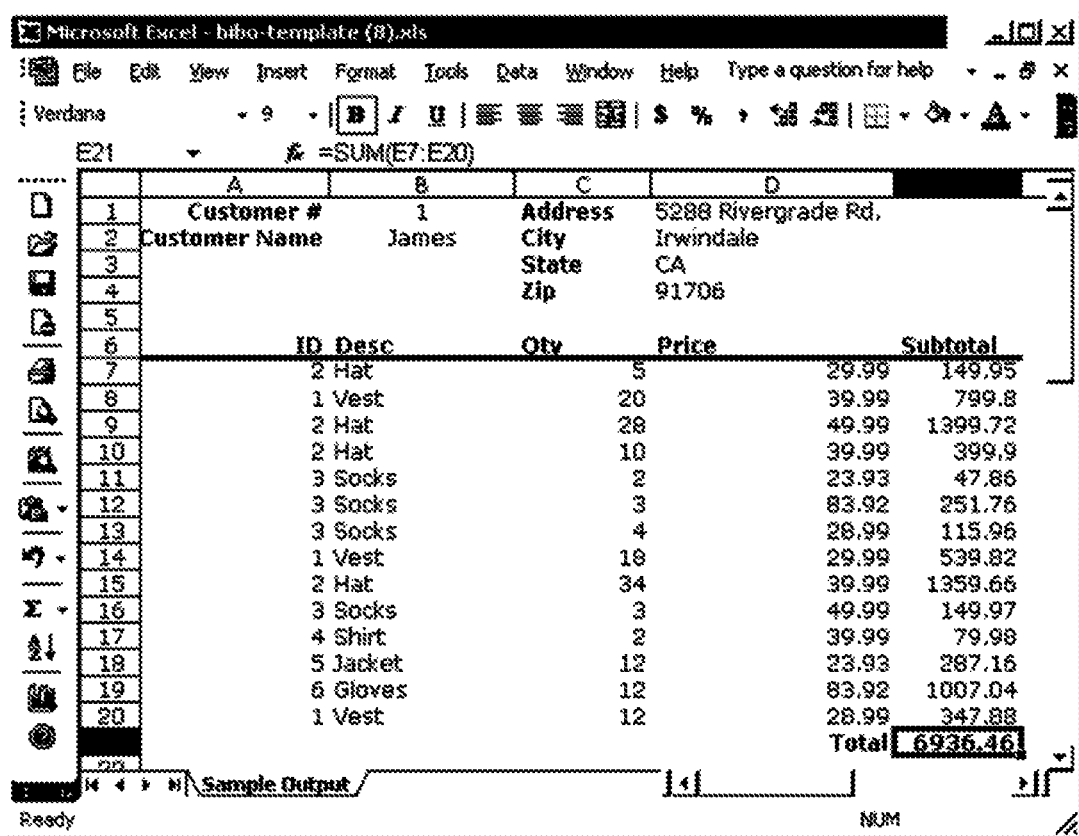
FIG. 8 shows a non-limiting example of the newly formed formula from FIG. 7 to demonstrate the interpreter introspecting and readjusting the values of the cells based on the resulting external datasets and the respective row insertions for the iterations.

FIG. 8 shows a non-limiting example of the newly formed formula from FIG. 7 to demonstrate the interpreter introspecting and readjusting the values of the cells based on the resulting external datasets and the respective row insertions for the iterations.

Metadata Sheet

In some embodiments, a template spreadsheet contains one or more metadata worksheets. In further embodiments, each metadata worksheet includes the following:

1. A definition of one or more external datasets: The definition of the external dataset(s) include(s) the tables and fields from an external relational DBMS.
2. Search filters: Search filters help whittle and limit the result sets returned from the external data source to something of more value to the user.
3. Sort Filters: The sort filter arranges and reshuffles the datasets from a straight data pull into a sorted array set.

Figure 9:
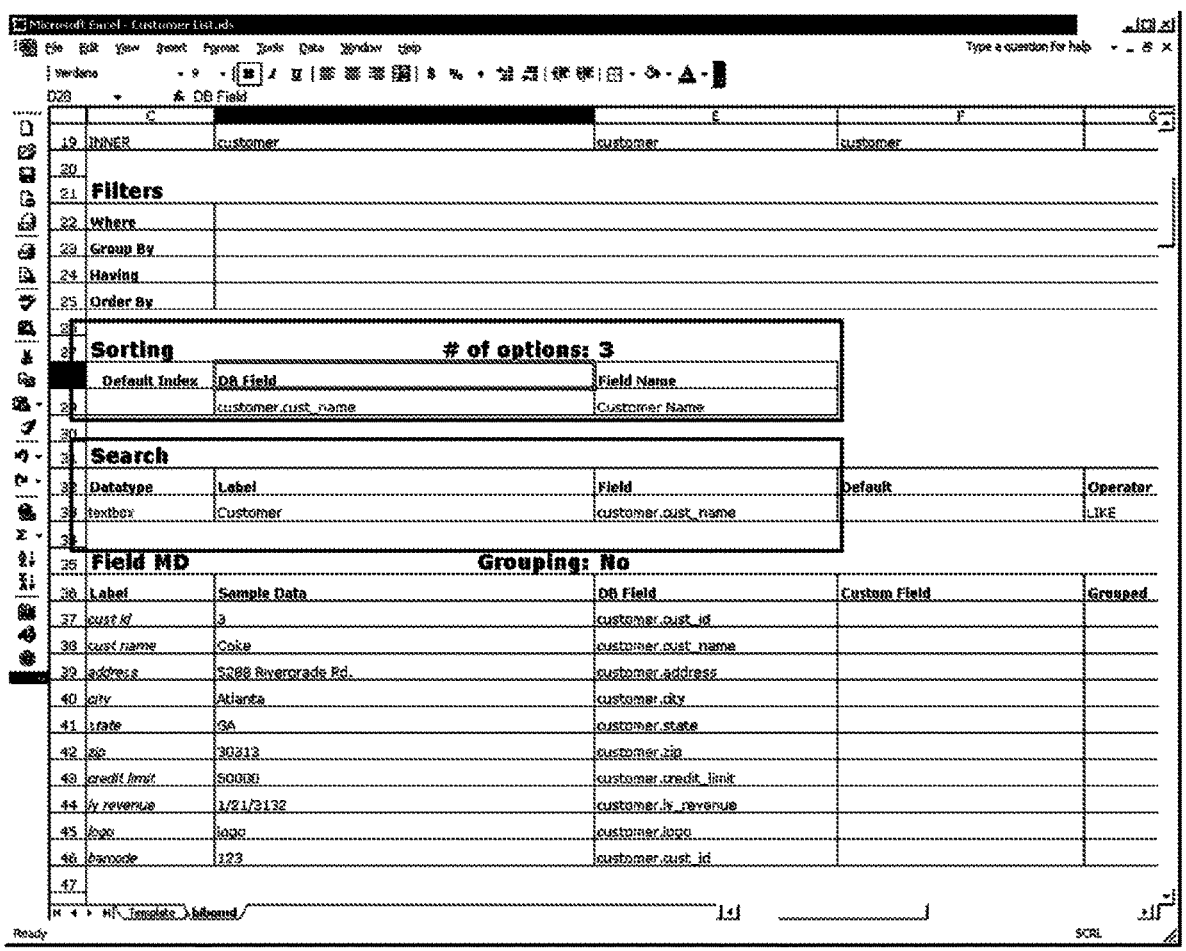
FIG. 9 shows a non-limiting example of a metasheet and the definition of the search and sort parameters in a spreadsheet.

FIG. 9 depicts an exemplary metadata sheet containing two sections. In this non-limiting embodiment, one section is marked as sort options. The sort section is between rows 27 and 29. Row 29 represents the possible sort options, which are to be loaded by the report form made available to the user. The search section is made available to the user through rows 31-33. Further, in this embodiment, each of these sections is read into the system and creates an application for the user in the form of HTML for the user to define their input parameters.

Figure 10:
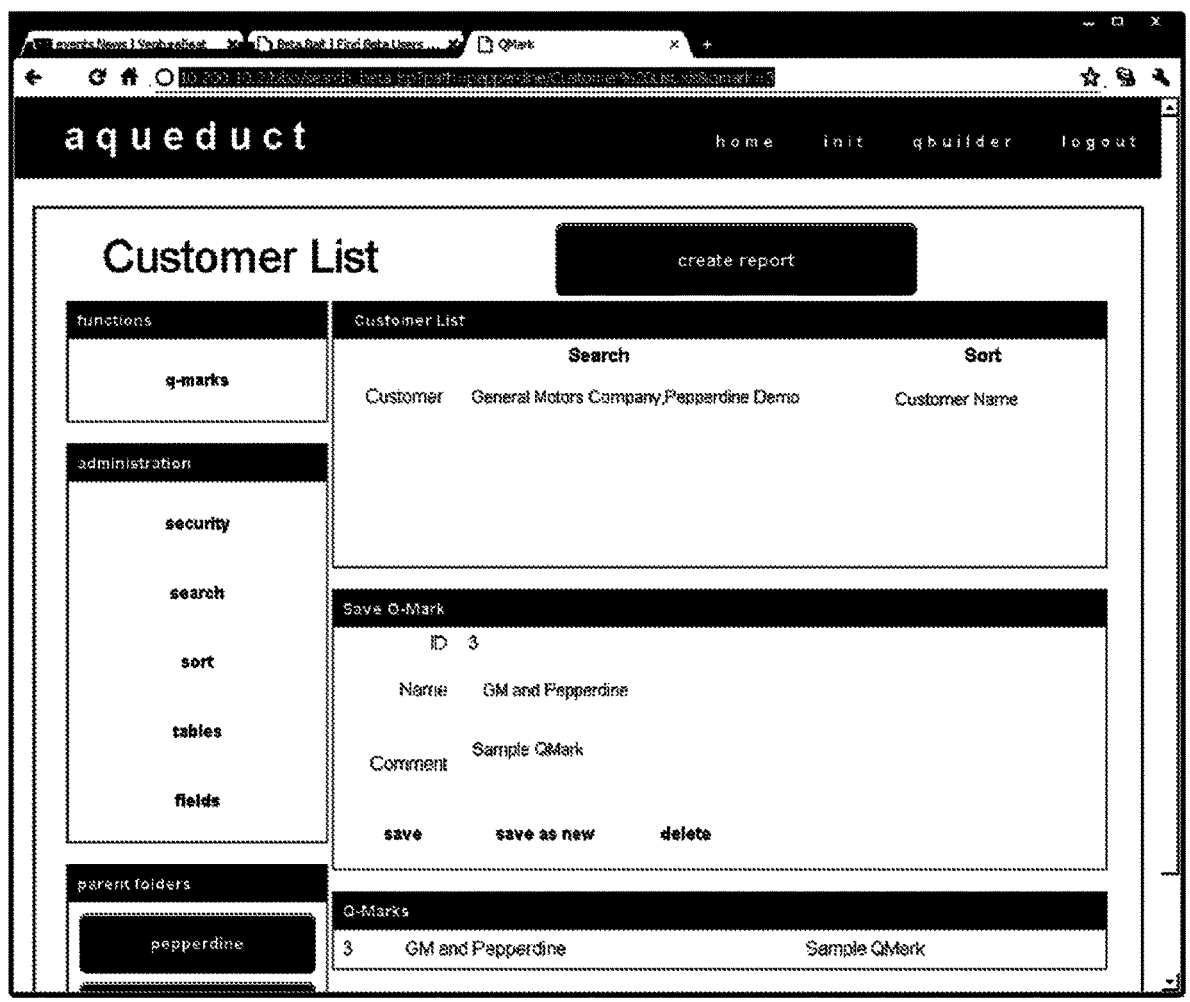
FIG. 10 shows a non-limiting example of search and sort parameters being rendered in an HTML form to filter and sort the external dataset. In this example, the parameters are also saved as query marks and referencable by the URL.

FIG. 10 depicts the resulting form in this particular embodiment.

Generating Reports

The systems, platforms, environments, applications, and methods disclosed herein create any suitable report. In some embodiments, a report is the generated output from the interpreter in binary form. In various further embodiments, the binary form is the binary format of spreadsheet applications including, but not limited to: Excel 95, Excel 97, Excel 2000, Excel XP, Excel 2003, Excel 2007, Excel 2010, Open Office Calc 1.0, Open Office Calc 2.0, and Open Office Calc 3.0. In other embodiments, the binary form of the report is the binary format of a word processing application. In some embodiments, the report is a plain text file. In some embodiments, the report is a PDF file.

Uses and Applications

The systems, platforms, environments, applications, and methods disclosed herein are suitable for any type of ad hoc query against a variety of data sources to generate a report. In some embodiments, a suitable query is against a wide range of disparate, external datasets to generate a report. In further embodiments, a suitable query is a cross-database query, wherein the systems, platforms, environments, applications, and methods disclosed herein initiate a plurality of simultaneous queries, each query symbolically represented as a single table.

Computer

In some embodiments, the systems, platforms, environments, applications, and methods described herein include a computer (e.g., digital processing device), or use of the same. In further embodiments, the computer includes one or more hardware central processing units (CPU) that carry out the device's functions. In still further embodiments, the computer further comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, set-top computers, handheld computers, Internet appliances, mobile smartphones, tablet computers, and personal digital assistants. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the computer includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the computer includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Medium

In some embodiments, the systems, platforms, environments, applications, and methods disclosed herein include one or more non-transitory computer readable media encoded with a program including instructions executable by the operating system of a digital processing device. In further embodiments, a computer readable medium is a tangible component of a digital processing device. In still further embodiments, a computer readable medium is optionally removable from a digital processing device. In some embodiments, a computer readable medium includes, by way of non-limiting examples, CD-ROMs, DVDs, flash memory devices, solid state memory, magnetic disk drives, magnetic tape drives, optical disk drives, cloud computing systems and services, and the like. In various embodiments, the encoding is permanent, substantially permanent, semi-permanent, or non-transitory.

Computer Program

In some embodiments, the systems, platforms, environments, applications, and methods disclosed herein include one or more computer programs. A computer program includes a sequence of instructions, executable in the digital processing device's CPU, written to perform a specified task. In light of the disclosure provided herein, those of skill in the art will recognize that a computer program may be written in various versions of various languages. Suitable programming languages include, by way of non-limiting examples, Java, VB, VB.NET, C#, C, C++, CFML, Python, Perl, Ruby, PHP, Objective C, JavaScript, Delphi, Lisp, Pascal, Ada, Assembly, ABAP, and Cocoa, or combinations thereof. In some embodiments, a computer program is created upon a software framework. Suitable software frameworks include, by way of non-limiting examples, Spring, Struts, Django, Ruby on Rails, ASP.NET, Struts, Lift, Tapestry, Seam, Wicket, Symfony, Yii, Drupal, Joomla, Grails, JBoss, Shale, Sling, Eclipse RAP, Oracle ADF, OpenXava, Richfaces, Google Web Toolkit, IceFaces, WebObjects, TurboGears, Zope, ColdFusion, BFC, DotNetNuke, MonoRail, Flex, and AJAX, or combinations thereof.

In some embodiments, a computer program comprises one sequence of instructions. In some embodiments, a computer program comprises a plurality of sequences of instructions. In various embodiments, a computer program comprises a file, a section of code, a programming object, a programming structure, or combinations thereof. In further various embodiments, a computer program comprises a plurality of files, a plurality of sections of code, a plurality of programming objects, a plurality of programming structures, or combinations thereof. In some embodiments, a computer program is delivered from one location. In other embodiments, a computer program is delivered from a plurality of locations. In yet other embodiments, a computer program is delivered from a cloud computing platform or service. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Software Modules

The systems, platforms, environments, applications, and methods disclosed herein include, in various embodiments, software, server, and database modules. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the software applications, systems, and methods described herein and are not meant to be limiting in any way.

Example 1

Creation of a Saved Report

The CEO of a company asks his head of sales to create a report of their top two customers that includes their credit limit, last year revenue, and credit to receivable ratio on a single report with a total at the bottom of the report with total credit limit, total last year revenue, and an average credit to revenue ratio. The head of sales does the following:

I. Pulls up the premade template;

II. Identifies the column headings on the report (see FIG. 11);

III. Tags the beginning and the ending of the row (see FIG. 11);

IV. Creates a formula for summation at the bottom for credit limit, last revenue, and adds an average credit to revenue ratio;

V. Saves the output to the application folder; and

VI. Types in "General Motors Company, Pepperdine Demo" into the search bar, saves the query and sends the CEO a link to the designated page with the saved query.

The CEO opens this bookmarked link and runs the report at his convenience without the intervention of developers, managers, or staff. See FIG. 12. This simple process takes a matter of 5-10 minutes to develop a new report without requiring a developer to understand a new procedural language.

Example 2

Use of a Saved Report to Create a Specification Sheet

A product development designer wants a specification sheet with a list of materials that includes the weights, costs, and quantities of all the respective components to produce a final good. He loads the URL for the system and types in the product stock-keeping unit (SKU) number into a search form and retrieves the resulting report. The report is formatted according to the manufacturer's specifications. The designer checks and verifies all the data is correct. The spreadsheet is e-mailed to the manufacturer to further product development.

Example 3

Single Day Export Report

A freight forwarding company wants a tally of all the containers they had exported for the day broken down by the respective countries. The company president runs a report with the begin date and end date of that particular day. The system lists all the SKUs, containers, vessels, and countries sorted in that same order.

Example 4

Sales Report

The sales manager of a company needs to compile a month end report of all the commission payable to her sales force. She enters 12/1/2011 as the start date and 12/31/2011 as the end date of her report sorted by salesman. The report has all the dollar amounts and commission rates in a tabular form with each line item containing a subtotal of quantity*price*commission rate. At the bottom of the spreadsheet are a number of calculations including summary of the total units shipped for that month, the average price point for all goods sold for the month, and the total commission rate to be paid for the month.

Example 5

Cross-Database Query

A cross-database query utilizes an in memory database that does not maintain any database storage mechanism. The system keeps a complete list of queries in metadata objects. Each query is symbolically represented as a single table. After all the independent result sets are converted to tables, the XDB database joins the tables and layers on additional processing to return a finalized result set.

Basic Overview

A particular embodiment, involves two queries:

Query 1: SELECT customer_id, customer_name FROM customer

Table Alias: xdb1

The resulting result set will yield the following dataset:

| customer_id | customer_name |
|---|---|
| 1 | Coke |
| 2 | Pepsi |
| 3 | KFC |
| 4 | Nestle |
| 5 | Dell |
| 6 | HP |

Query 2: SELECT order_id, customer_id, order_date FROM orders

Table Alias: xdb2

The resulting result set will yield the following dataset:

| order_id | customer_id | order_date |
|---|---|---|
| 1 | 1 | 12/12/2011 |
| 2 | 1 | 12/13/2011 |
| 3 | 2 | 12/14/2011 |
| 4 | 2 | 12/15/2011 |
| 5 | 3 | 12/16/2011 |
| 6 | 4 | 12/17/2011 |

Each query is given a table alias. In this example, Query 1 is aliased as xdb1 and Query 2 is aliased as xdb2.

The cross-database query is:

```
SELECT
    xdb1.customer_name,
    xdb2.order_date
FROM
    xdb1
    INNER JOIN xdb2 ON xdb1.customer_id = xdb2.customer_id
```

The cross-database query initiates two simultaneous queries. Each of the result sets will reside within the in memory database as table objects. The table objects are then processed and run through the XDB database engine to assemble a final result set.

| order_id | customer_name | order_date |
|---|---|---|
| 1 | Coke | 12/12/2011 |
| 2 | Coke | 12/13/2011 |
| 3 | Pepsi | 12/14/2011 |
| 4 | Pepsi | 12/15/2011 |
| 5 | KFC | 12/16/2011 |
| 6 | Nestle | 12/17/2011 |

The workflow in this example is:

First, the cross-database engine receives the query:

```
SELECT
    xdb1.customer_name,
    xdb2.order_date
FROM
    xdb1
    INNER JOIN xdb2 ON xdb1.customer_id = xdb2.customer_id
```

Second, the cross-database engine issues queries the following queries to disparate remote databases:

Query 1: SELECT customer_id, customer_name FROM customer

Query 2: SELECT order_id, customer_id, order_date FROM orders

Third, the cross-database engine receives a result set from each of Query 1 and Query 2 simultaneously and assembles a new result set to pass back to the XDB client. The system reviews the number of columns that were selected and constructs a two column result set (xdb1.customer_name, xdb2.order_date) based off the number of rows after the two result sets have been joined based on the inner join statement.

Cross-Database Query with Respect to Metadata Sheets

The cross-database query is based off a list or assortment of disparate queries to be issued by the cross-database query engine. These queries are actually stored within a metadata sheet described herein.

Figure 13:
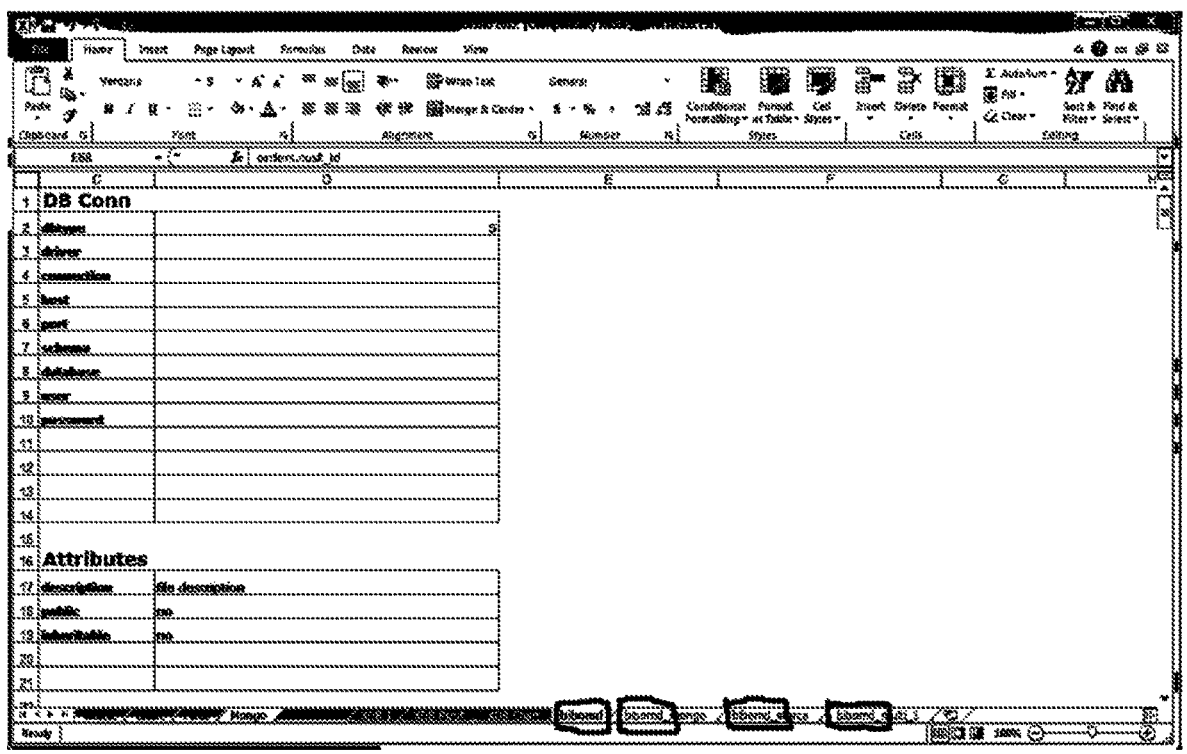
FIG. 13 shows a non-limiting example of a metadata sheet; in this case, a metadata sheet storing a list of disparate queries to be issued by a cross-database query engine in order to perform a cross-database query as described in Example 5.

Referring to FIG. 13, in a particular embodiment, the metadata sheets are labeled within the system with a prefix of "bibomd."

The query assembly for each sub-query is based off the field labels of the metadata sheet. Each sub query or child query is a direct query to a database.

Figure 14:
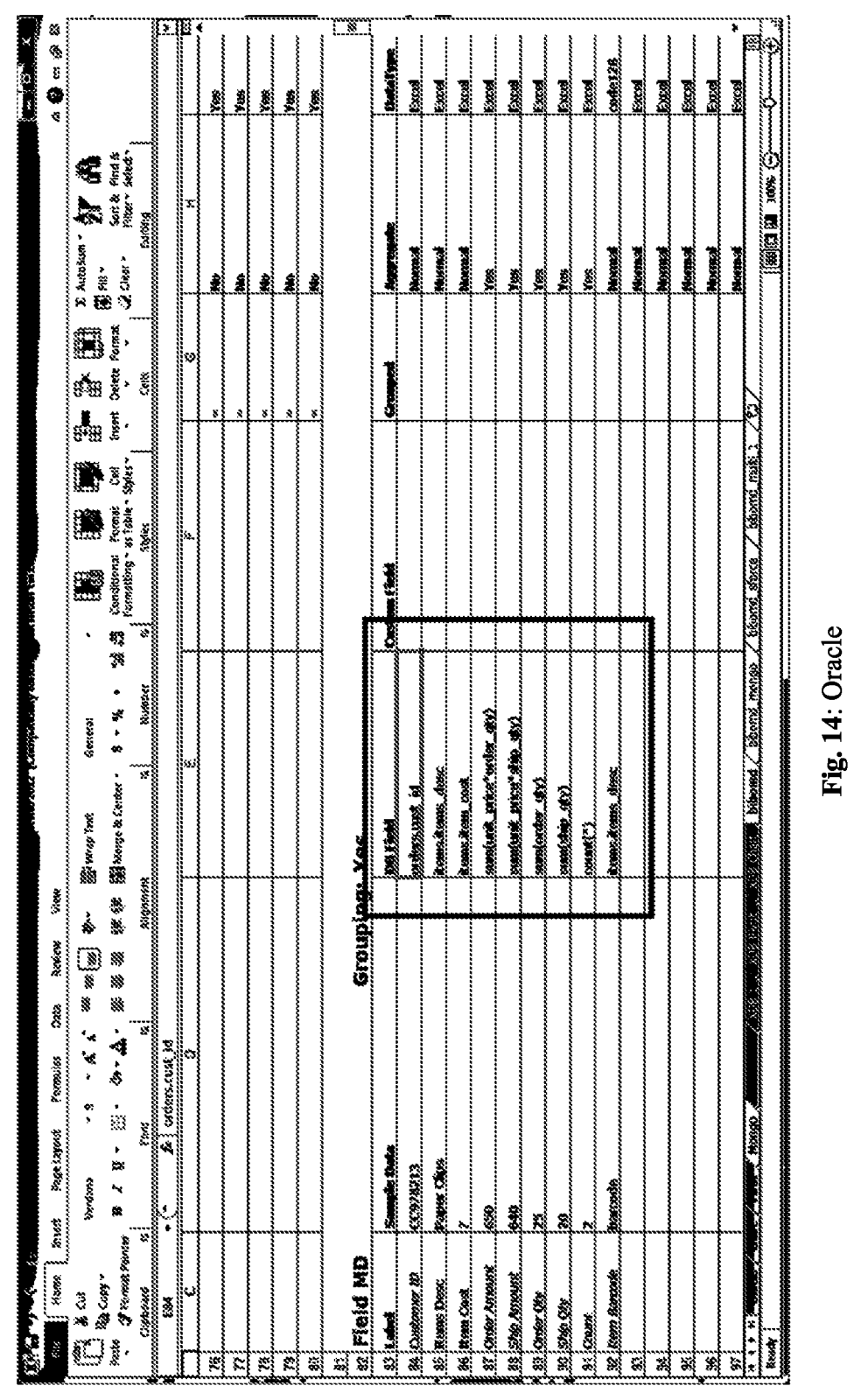
Figure 15:
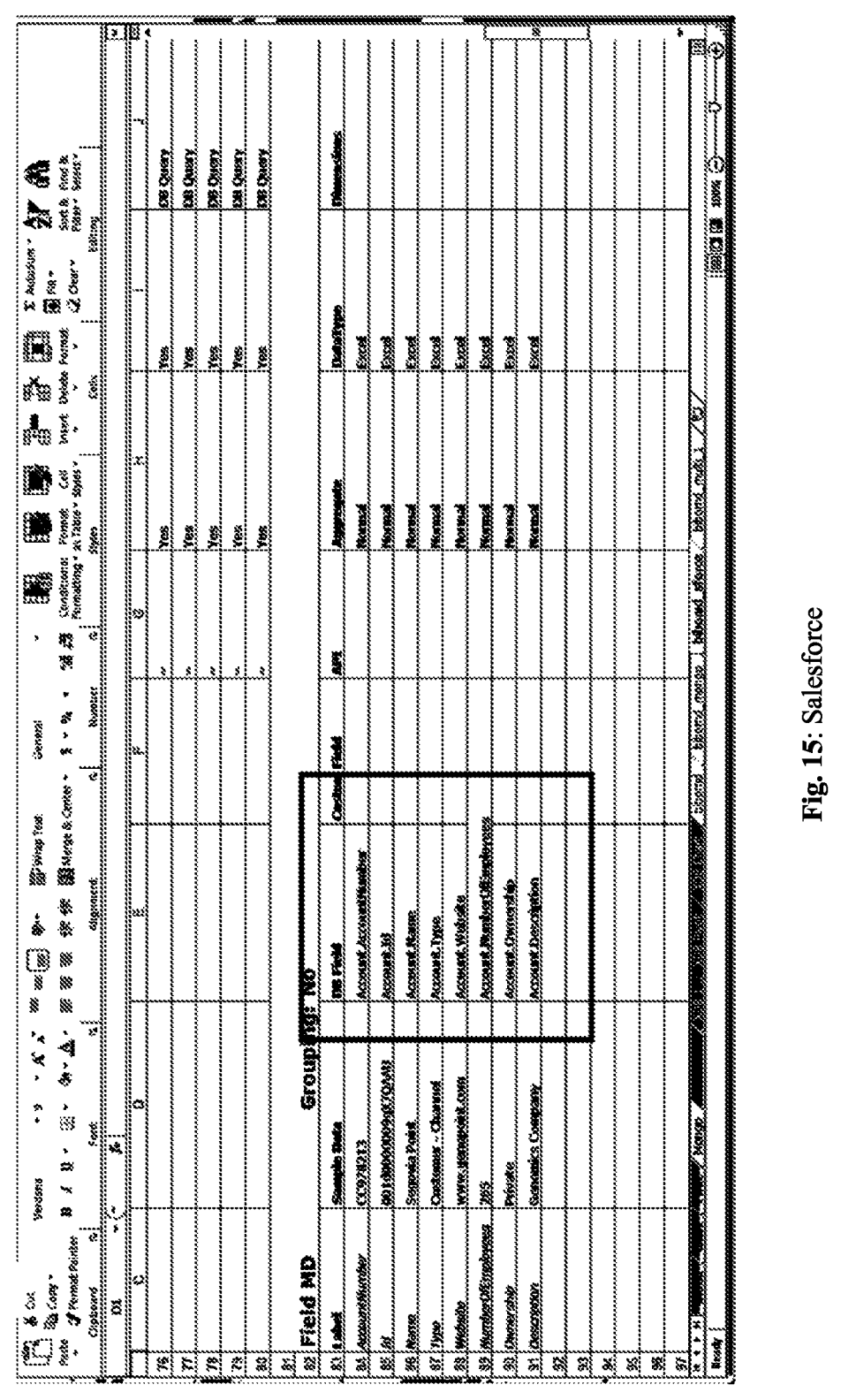
Figure 16:
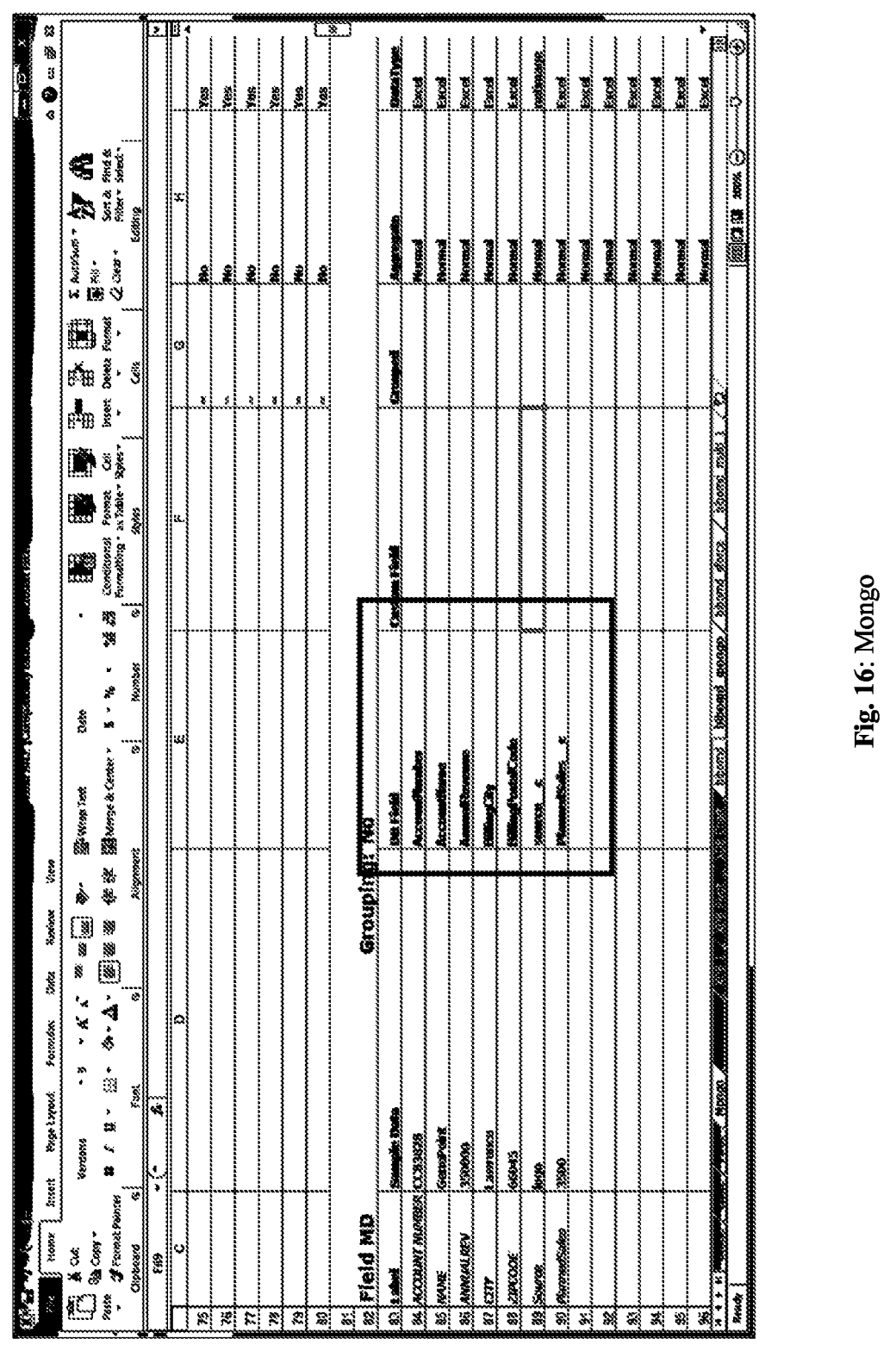

Referring to FIGS. 14-16, shown are multiple metadata sheets coming from multiple data sources. See, e.g., FIG. 14 (Oracle), FIG. 15, (Salesforce), and FIG. 16 (Mongo).

Cross-Database Query with Respect to Aliased Field Objects

Figure 17:
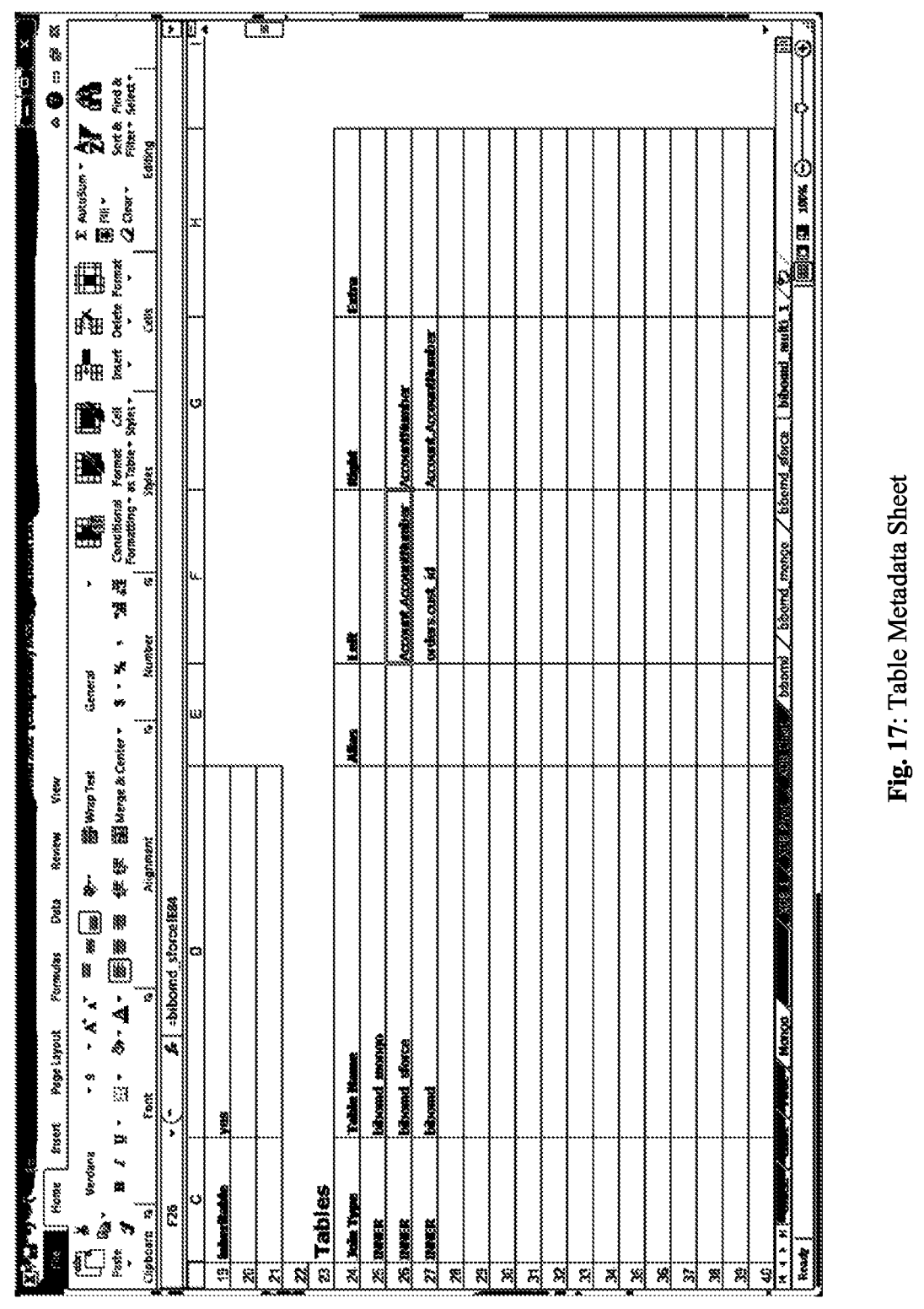

Referring to FIG. 17, a cross-database query described herein stores the reference queries as aliased tables like the ones in column D. The join points are defined using the Microsoft Excel reference formulas using the equal sign to reference the corresponding field from where that field could potentially pull from. In this specific example, the table aliases are the same as the metadata sheet names that were declared above. They match verbatim in name. The highlighted cell, F26, contains a formula to another worksheet within labeled "bibomd_sforce" to cell E84. This reference/mapping is used to "join" the resulting datasets aliased in column D as tables.

Cross-Database Query Field Selection and Construction

After the XDB retrieves and queries all the respective data sources, the XDB engine needs to construct a brand new result set. The new result set is based off the field mappings defined in the metadata sheet. The fields are referencing the metadata sheets through the reference formula methodology.

Referring to FIG. 18, if one were to map the AccountNumber as a field from the Salesforce result set, the system would use a reference formula to the "bibomd_sforce" worksheet targeted at cell E90. The mapping process would put together an aggregated result set from the disparate data sources.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-based system for implementing a spreadsheet-based programming language adapted for report generation, said system comprising:
   a) a networked computer comprising a processor, an operating system configured to perform executable instructions, and a memory device;
   b) a computer program including instructions executable by a digital processing device to create an environment to implement the spreadsheet-based programming language for the report generation, wherein said environment is an independent parser and interpreter not embedded or associated to a spreadsheet application, said environment configured for:
      i) obtaining a plurality of template spreadsheets containing one or more template worksheets and one or more metadata worksheets, wherein the one or more metadata worksheets comprises: a definition of one or more external datasets, search filters and sort filters, wherein the plurality of template spreadsheets are used as source code;
      ii) interpreting procedural functions by reading tags defined in one or more of the plurality of template spreadsheets, wherein reading the tags comprises:
         rendering a parameter based form which gives a user ability to either filter and narrow a dataset and/or sort a resulting dataset; and
         importing a template worksheet from the plurality of template spreadsheets and merging it with an external dataset from the one or more external datasets to create a new spreadsheet to serve as basis of a report to be delivered to the user,
         wherein the procedural functions specify content and format of the report, and wherein the tags comprise at least one tag designating a beginning of a loop, an ending of a loop, a beginning of a nested loop, an ending of a nested loop, or a combination thereof;
      iii) accessing, reading and storing a structure of the external dataset within the newly created spreadsheet, wherein a reference to the external dataset is created through a cell-based formula; and
      iv) generating the report, wherein the report comprises generated output from the interpretation of procedural functions in binary form of a spreadsheet application, a word processing application, a plain text file, a pdf file, or any combination thereof.

2. The system of claim 1, wherein the one or more external datasets are databases.

3. The system of claim 2, wherein the databases are relational databases, non-relational databases, object oriented databases, object databases, entity-relationship model databases, associative databases, or XML databases.

4. The system of claim 1, wherein the one or more external datasets are tabular datasets.

5. The system of claim 4, wherein the tabular datasets are comma separated text files, tab delimited text files, or binary files with a native dataset embedded with a tabular structured dataset.

6. The system of claim 1, wherein the environment is configured for accessing, reading, and storing the structure of the one or more external datasets, wherein the environment is configured to store the structure as symbolic references.

7. The system of claim 1, wherein the procedural functions are interpreted to execute a query.

8. The system of claim 7, wherein the query includes one or both of: search and sort parameters.

9. The system of claim 7, wherein the environment is further configured for saving the query for later execution.

10. The system of claim 9, wherein the saved query is represented by a URL that executes the query when activated.

11. The system of claim 1, wherein generating the report comprises applying properties of a metadata worksheet to the report.

12. The system of claim 1, wherein the report is generated as binary data in a form of one or more spreadsheets, XML documents, HTML documents, reporting software documents, word processor documents, or presentation software documents.

13. Non-transitory computer-readable media encoded with a computer program including instructions executable by a computer to create a reporting environment, wherein said reporting environment is an independent parser and interpreter not embedded or associated to a spreadsheet application, said reporting environment configured for:
   a) obtaining a plurality of template spreadsheets containing one or more template worksheets and one or more metadata worksheets, wherein the one or more metadata worksheets comprises: a definition of one or more external datasets, search filters and sort filters, wherein the plurality of template spreadsheets are used as source code;
   b) interpreting procedural functions by reading tags defined in one or more of the plurality of template spreadsheets, wherein reading the tags comprises:
      rendering a parameter based form which gives a user ability to either filter and narrow a dataset and/or sort a resulting dataset; and
      importing a template worksheet from the plurality of template spreadsheets and merging it with an external dataset from the one or more external datasets to create a new spreadsheet to serve as basis of a report to be delivered to the user,
      wherein the procedural functions specify content and format of the report, and wherein the tags comprise at least one tag designating a beginning of a loop, an ending of a loop, a beginning of a nested loop, an ending of a nested loop, or a combination thereof;
   c) accessing, reading and storing a structure of the external dataset within the newly created spreadsheet, wherein a reference to the external dataset is created through a cell-based formula; and
   d) generating the report, wherein the report comprises generated output from the interpretation of procedural functions in binary form of a spreadsheet application, a word processing application, a plain text file, a pdf file, or any combination thereof.

14. The media of claim 13, wherein generating the report comprises applying properties of a metadata worksheet to the report.

15. The media of claim 13, wherein the procedural functions are interpreted to execute a query.

16. The media of claim 15, wherein the query includes one or both of: search and sort parameters.

17. The media of claim 15, wherein the reporting environment is further configured for saving the query for later execution.

18. The media of claim 17, wherein the saved query is represented by a URL that executes the query when activated.

19. A computer-implemented method of generating a report, comprising the steps of:
   a) obtaining a template spreadsheet comprising a template worksheet and a metadata worksheet, wherein the metadata worksheet comprises: a definition of one or more external datasets, search filters and sort filters, wherein the template spreadsheet is used as source code;
   b) interpreting, by a computer processor, procedural functions by reading tags defined in the template spreadsheet, wherein reading the tags comprises:
      rendering a parameter based form which gives a user ability to either filter and narrow a dataset and/or sort a resulting dataset; and
      importing the template worksheet from the template spreadsheet and merging it with an external dataset from the one or more external datasets to create a new spreadsheet to serve as basis of a report to be delivered to the user,
      wherein the procedural functions specify content and format of the report, and wherein the tags comprise at least one tag designating a beginning of a loop, an ending of a loop, a beginning of a nested loop, an ending of a nested loop, or a combination thereof;
   c) accessing, reading and storing a structure of the external dataset within the newly created spreadsheet, wherein reference to the external dataset is created through a cell-based formula; and
   d) generating the report, wherein the report comprises generated output from the interpretation of procedural functions in binary form of a spreadsheet application, a word processing application, a plain text file, a pdf file, or any combination thereof.

20. The method of claim 19, wherein interpreting the procedural functions by reading tags defined in the template spreadsheet comprises the steps of:
   reading the template spreadsheet into memory;
   reading the tags into memory, wherein the tags define programming instructions;
   reading the external dataset into memory;
   generating the new spreadsheet;
   applying properties of the template spreadsheet to the new spreadsheet;
   inserting rows and columns into the new spreadsheet based on the external dataset;
   performing the defined programming instructions; and
   outputting the new spreadsheet in binary data format.

21. The method of claim 19, wherein the output is a spreadsheet.

22. The method of claim 19, wherein the report is binary data in a form of one or more spreadsheets, XML documents, HTML documents, reporting software documents, word processor documents, or presentation software documents.

* * * * *